United States Patent [19]

de Crouppe et al.

[11] Patent Number: 5,133,436
[45] Date of Patent: Jul. 28, 1992

[54] STEERING COLUMN MOUNTED GEAR SELECTOR MECHANISM FOR AUTOMATIC TRANSMISSIONS HAVING SAFETY LOCK

[75] Inventors: Guido de Crouppe, Frechen; Graeme Turner, Much, both of Fed. Rep. of Germany

[73] Assignee: Ford Motor Company, Dearborn, Mich.

[21] Appl. No.: 733,581

[22] Filed: Jul. 22, 1991

[30] Foreign Application Priority Data

Sep. 5, 1990 [DE] Fed. Rep. of Germany ....... 4028061

[51] Int. Cl.$^5$ .................. B60K 41/26; G05G 5/08
[52] U.S. Cl. .................... 192/4 A; 74/483 R
[58] Field of Search ......... 192/4 A; 74/483 R, 483 K

[56] References Cited

U.S. PATENT DOCUMENTS

| | | | |
|---|---|---|---|
| 3,942,614 | 3/1976 | Thompson | 192/4 A |
| 4,936,431 | 6/1990 | Shinpo | 74/483 K X |
| 4,981,048 | 1/1991 | Kobayashi et al. | 192/4 A X |
| 5,022,504 | 6/1991 | Kobayashi | 192/4 A |
| 5,031,736 | 7/1991 | Kobayashi et al. | 74/483 R X |

FOREIGN PATENT DOCUMENTS 1203756 4/1986 Canada .................. 192/4 A

*Primary Examiner*—Allan D. Herrmann
*Attorney, Agent, or Firm*—Frank G. McKenzie; Roger L. May

[57] ABSTRACT

A steering column shift mechanism having a wheel brake interlock includes a gear selector shaft moved by a gear selector action initiated by the vehicle operator manually by manipulating a gear selector lever between a park position and at least one drive position. A brake pedal actuates a switch within an electrical circuit containing an electrical solenoid and a power supply to actuate a locking bolt that blocks movement of the selector shaft unless the brake pedal is depressed. The selector lever includes an arm extending into a shift gate containing a system of interconnected recesses corresponding to selected drive positions among which the selector lever 15 moved. A locking bolt, actuated by an electrical solenoid for movement parallel to the axis of the selector shaft, includes a ramp contacted by a spring-loaded bolt mounted for movement laterally with respect to a second bolt, held by a compression spring in contact with the selector lever.

13 Claims, 2 Drawing Sheets

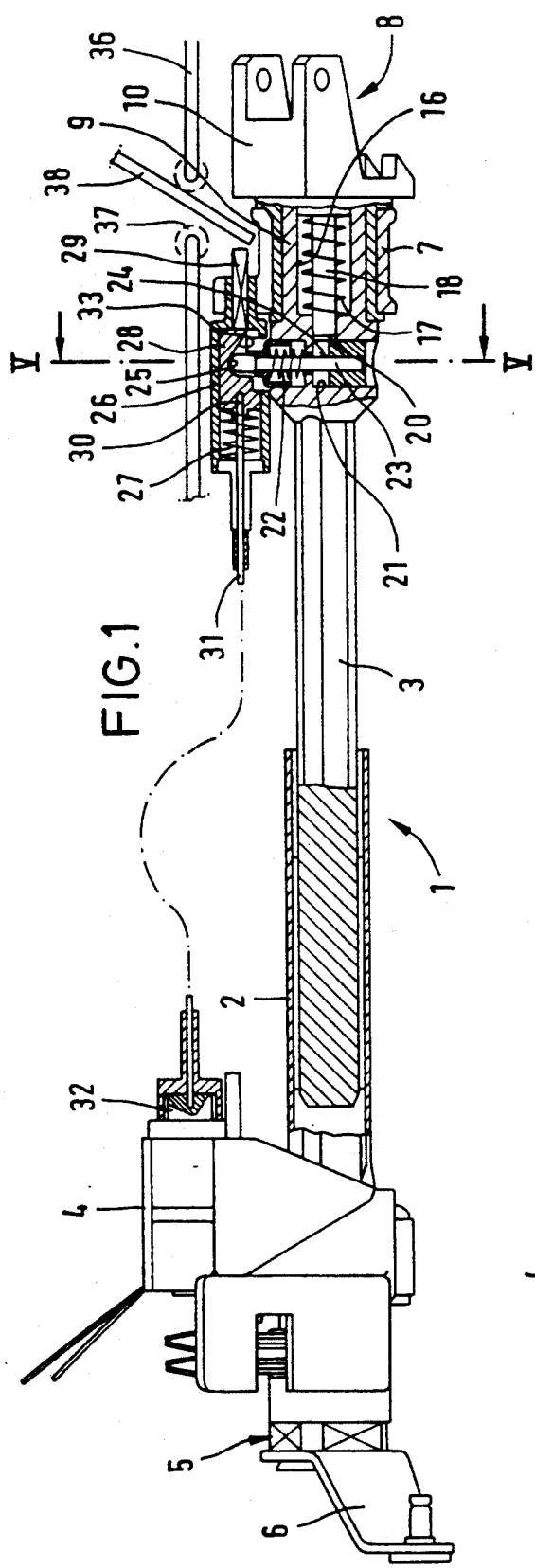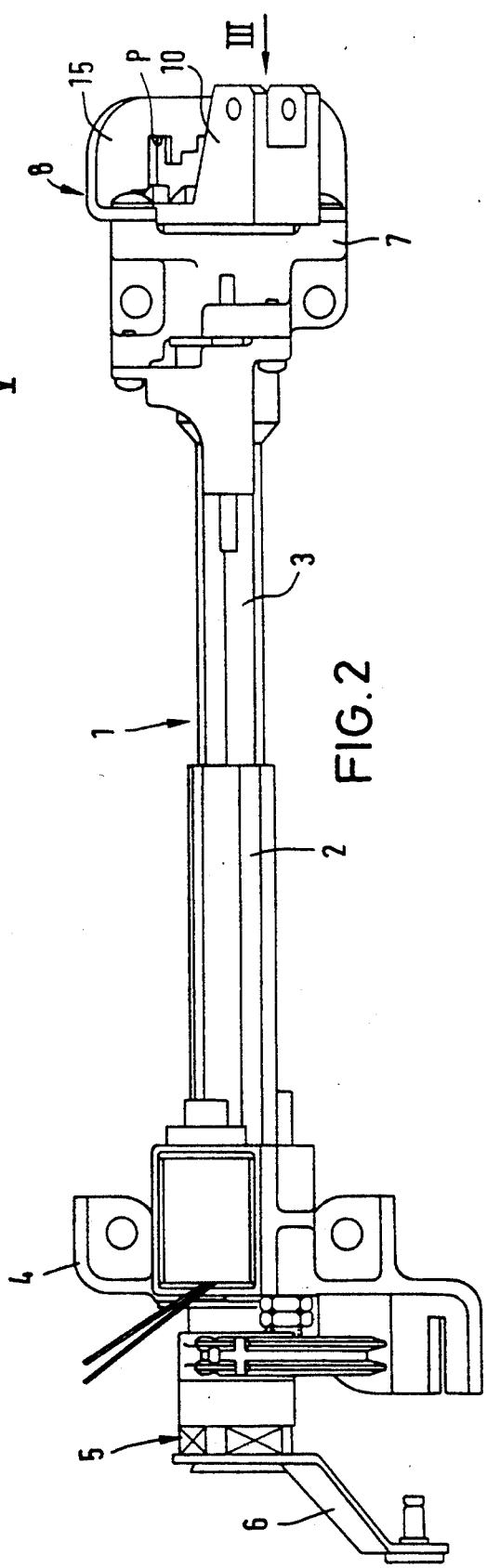

STEERING COLUMN MOUNTED GEAR SELECTOR MECHANISM FOR AUTOMATIC TRANSMISSIONS HAVING SAFETY LOCK

BACKGROUND OF THE INVENTION

1. Field of the Invention

This invention relates to a shift mechanism for an automatic transmission having a brake pedal interlock. In particular the invention pertains to a shift mechanism mounted on the steering column of a motor vehicle.

2. Description of the Prior Art

U.S. Pat. No. 3,942,614 describes a safety interlock for a automatic transmission shift mechanism mounted on the vehicle steering column. In that device, the gear selector shaft extending parallel to the steering column is pivotally actuated by a manual selector lever and moves between park and drive position. The brake pedal for actuating the wheel brakes of the vehicle is moveable between an unactuated and an actuated position. When the brake pedal is not actuated in a locking position, a locking mechanism, in a form of a locking bolt actuated by a solenoid, is located where movement of the manual selector lever from the park position to the drive position is blocked. When the brake pedal is actuated, the solenoid is energized through a switch and an electrical connection, thereby moving the locking bolt to a position where the operation is free to select the operating range of the transmission by moving the gear selector mechanism to the selected position.

The gear shift mechanism described in the '614 patent has the disadvantage that the locking bolt is located transversely to the pivoting movement of the selector mechanism, which pivots due to the effect of manual selector lever and a gear shift shaft movement. Furthermore, a force applied by the operator of the motor vehicle to the manual selector lever transversely to the locking bolt is applied to the locking bolt. Consequently, the locking mechanism can be damaged easily or deformed as a result of an attempt to move the manual selector lever forcibly from the park position to the drive position. Damage to the mechanism resulting from this action impairs operation of the mechanism.

SUMMARY OF THE INVENTION

An object of this invention is to provide a shift mechanism for an automatic transmission capable of being mounted on the steering column of the motor vehicle and having a foot brake safety interlock. Operation of the mechanism ensures that forces exerted by the manual selector lever cannot deform components of the assembly nor cause the mechanism to malfunction.

The manual selector lever is pivoted about a rod disposed transversely to the gear selector shaft against the force of a spring-loaded bolt disposed axially in the gear-selector shaft. In order to lift a locking bolt from a deep park recess on a gear shift gate disposed concentrically with the selector shaft, a second locking bolt, actuated by an electrical controller, is moved axially parallel to a spring-loaded bolt located in a guide tube. The locking bolt cooperates with a spring-loaded transverse bolt on the selector shaft head, which locks movement of the spring-loaded bolt to prevent the manual selector lever moving out of the park recess, provided the brake pedal is not actuated. When the brake pedal is actuated, the shift selector shaft is released. Lifting movement of the selector lever is blocked in such a way that forces applied to the manual selector lever cannot deform the locking mechanism.

The locking bolt actuated by the electrical controller forces the spring-loaded transverse bolt to move due to its contact with a ramp on the locking bolt. The transverse bolt includes a reduced diameter portion near its axial midpoint to allow movement of the spring-loaded bolt located concentrically with the selector shaft.

The locking bolt, actuated by the electrical controller, preferably includes an actuating pin, which projects beyond the guide tube and can be released in the event of a malfunction of the electrical controller by a tool, such as a screwdriver or another prying instrument.

The gear selector shaft consist of two parts, a sleeve and a shaft, which slides into the sleeve. The electrical controller is located on a lower gear shaft mounting. It can be connected to the spring-loaded locating bolt by a Bowden cable having slack between its end connections to permit relative displacement of its ends.

BRIEF DESCRIPTION OF THE DRAWINGS

The invention is described in more detail with reference to an embodiment illustrated in the drawings.

FIG. 1 is a side view, partially in cross section in the vicinity of a safety lock, of a steering column mounted gear selector shaft.

FIG. 2 a plan view of the assembly shown in FIG. 1.

DESCRIPTION OF THE PREFERRED EMBODIMENT

Figure 3:
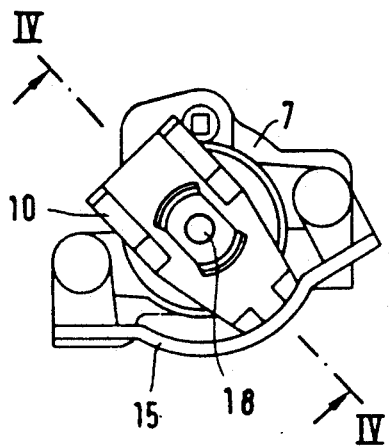
FIG. 3 is an end view taken in the direction of arrow III—III in FIG. 2.
Figure 4:
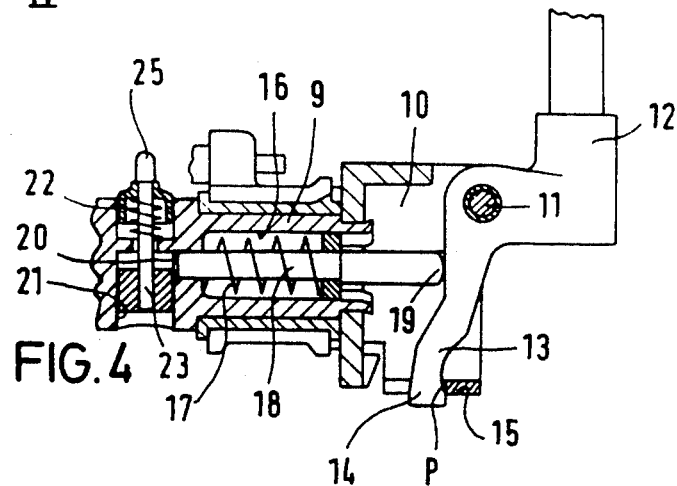
FIG. 4 is a cross section taken at plane IV—IV in FIG. 3.
Figure 5:
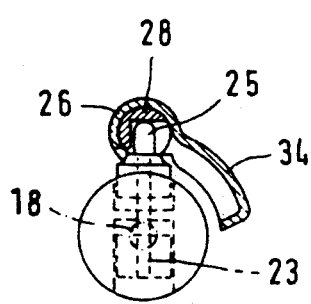
FIG. 5 and FIG. 6 are cross sections taken at plane V—V in FIG. 1 showing the mechanism with the positions arranged in the locking position and the release position, respectively.
Figure 6:
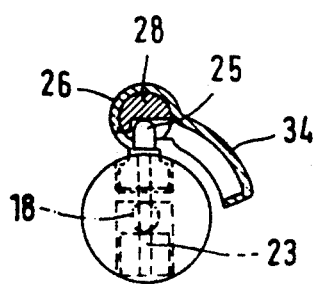

Referring to FIGS. 1 and 2, the gear shift selector shaft 1 includes the first outer hollow shaft 2 and a second shaft 3 telescoping within the first shaft. This arrangement permits longitudinal adjustment of the position of the steering wheel and prevents intrusion of the shift selector shaft into the passenger compartment in the event of a collision.

Shaft part 2 is a polygonal hollow shaft, pivotally received in a lower selector shaft mounting 4, which is fastened to the steering column of the motor vehicle. The selector shaft part 2 has a foot 5 on which there is rotatably support a gear selector lever 6 for transmitting motion of the manually operating gear selector lever to an automatic transmission controlled manually in this way.

The upper shaft part 3 is a polygonal shaft that carries a selector shaft 8 and is pivotally received in an upper selector shaft mounting 7 fastened to the steering column.

Referring now to FIGS. 3–6, shaft head 8 includes a large diameter portion 9 of the selector shaft, which is connected to a mounting bracket 10 that pivotally supports the manual selection lever 12 on the surface of rod 11, disposed transversely with respect to the axis of shaft 1. Manual selector lever 12 has an angle lever arm 13, extending radially outward from the axis of rod 11 to an end 14 that passes through the thickness of a gear-shift gate 15 fastened on the shaft mounting 7. The upper portion 9 of shaft 3 has a central cavity 16 in which bolt 18, loaded by a spring in the direction of lever arm 13, is located. The spring-loaded bolt 17,18 has an end 20 urged by the spring into contact with lever arm 13 of the manual selector lever 12. In order to allow the manual selector lever to be moved from the park position, determined by a recess P formed in the gear-shift gate 15, to another of several spaced recesses corresponding to various drive positions, it is necessary to raise the manual selector lever toward the driver against the force of the spring.

If the manual selector lever 12 is raised in this direction, the spring-loaded bolt is urged axially downward until its lower end 20 projects into a transverse bore 21. The spring-loaded transverse bolt 22,23, located within transverse bore 21, has a neck or recess portion 24 and an actuating pin 25, both displaceable within the bore. The spring-loaded transverse bolt 22,23 is held by spring 22 such that bolt 23 normally blocks or prevents movement of the spring-loaded locking bolt 17,18 due to contact of the outer or blocking surface of bolt 23 with the end 20 of bolt 18. The safety lock is therefore located in its locking position, that shown in FIG. 5.

A guide tube 26 for a spring-loaded locking bolt 28 is located on the upper gear shaft mounting 7 and is disposed parallel to the gear shift shaft 1. The locking bolt 28 has an outwardly projecting actuating pin 29 at its upper end. The opposite end 30 of locking bolt 28 is connected to a Bowden cable 31, which is actuated by an electrical controller 32 against the force of spring 27. The electrical controller 32 may be an electrical solenoid or a servomotor or a suitable equivalent thereof. Locking bolt 28 has a ramp 33 adapted for contact with actuating pin 25 at the end of the spring-loaded transverse bolt 22,23.

Figure 7:
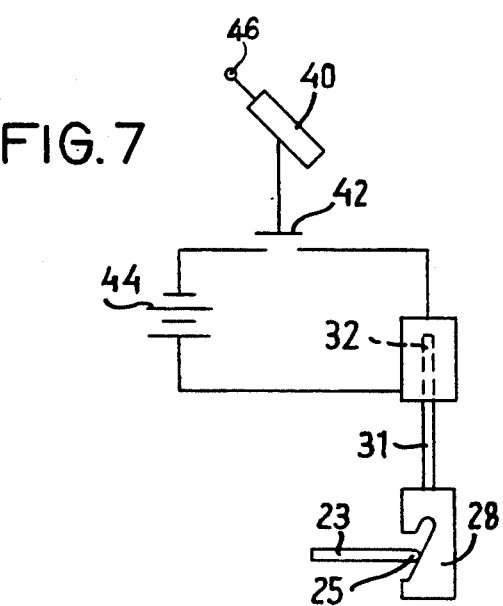
FIG. 7 is a circuit containing a solenoid used to displace a locking bolt.

The guide tube 26 for the spring-loaded locking bolt 28 is provided with a guide region 34, which extends angularly and allows pivoting movement of actuating pin 25 on the end of transverse bolt 22,23. Electrical controller 32 may be an electrical solenoid having a winding energized by the electrical system of the motor vehicle. When locking bolt 28 is pushed downward by the Bowden cable 31 due to solenoid 32 being energized, actuating pin 25 and transverse bolt 22,23 are displaced so far inwardly in a transverse bore 21 by ramp 24 that the lower ends 20 of the spring-loaded bolt 17,18 can move into the neck portion 24, thereby permitting manual selector lever 12 to pivot about pin 11 and allowing its end 14 to clear the detent recess where currently located. The safety lock then is in its release position, that shown in FIG. 6. Locking bolt 28 is actuated by energizing the electrical solenoid 32 from an electric power source 44 upon closing an electrical switch 42 in a circuit, the switch being actuated by depressing the foot brake pedal 40 about pivot 46. FIG. 7 shows the circuit containing the controller 32.

When manual selector lever 12 moves to any of the drive positions, actuating pin 25 is located in the guide region 34 and the transverse bolt 22,23 is held by the end 20 of bolt 17,18 in its release position. Locking bolt 28 located in guide tube 26 returns to its locking position determined by spring 27 and pulls the end of the Bowden cable 31 connected to the transmission manual valve along a corresponding position. The manual selector lever can then be radially moved between the various drive positions without releasing or applying the brake pedal.

Only when manual selector lever 12 is pivoted into the park position can its lever arm 13 move so that the end 14 of the lever arm is located in the park recess P on the gear shift gate 15. Then bolt 17,18 moves from the region of the transverse bore and, in so doing, releases the spring-loaded transverse bolt 22,23 so that it can move back into its locking position, the position of FIG. 5.

Normally shaft 1 is covered by a steering column casing 36. An aperture 37 is provided in the steering column casing in the region of the safety lock close to actuating pin 29 so that the safety lock can be released manually by a simple tool 38 such as a screwdriver, ignition key or a prying instrument. When the safety lock is released manually, the motor vehicle can be started despite a malfunction of the electrical solenoid 32, the power supply or the circuit containing the solenoid.

By suitably configurating lever arm 13, its end 14, and gear-shift gate 15, the brake interlock gear shift mechanism according to this invention operates so that it is necessary to depress the brake pedal not only for movement into and out of the park position but also the reverse drive position.

If sufficient space is available, the electrical controller can be located directly on the guide tube 26 of the spring loaded locking bolt 27,28. In this configuration, the locking bolt itself can be the armature of the solenoid or servomotor.

If insufficient space is available at the top of the steering column, the electrical controller can be fixed at the bottom of the lower gear-shift shaft mounting 4. A connection is produced by a Bowden cable 31 having slack along its length so that intentional or accidental adjustment in the length of the steering column shaft does not affect the safety lock.

We claim:

1. A system for controlling operation of the gear selector mechanism of an automatic transmission comprising:

a pivotally mounted gear selector lever having an arm extending radially from a pivot;

a gear selector gate having a system of interconnected recesses corresponding to selected gear range positions, the arm of the selector lever being located in said recess system and moveable among said recesses;

an actuating bolt mounted for displacement along its axis, having a blocking surface extending along a portion of the axis of the actuating pin and a recess extending along a second portion of said axis;

a first bolt mounted for displacement along its axis, having a first end adjacent the arm of the selector lever and a second end directed toward the actuating pin, contact between the blocking surface of the actuating pin and the second and preventing movement of the selector lever out of a recess in the selector gate, location of the second end in the recess of the actuator pin permitting movement of the selector lever out of a recess in the selector gate;

a locking bolt mounted for displacement along its axis, having a inclined surface extending along the length of the locking bolt such that the radial distance of the inclined surface from the axis of the locking bolt varies along the axis of the locking bolt, the actuating pin contacting the inclined surface;

a brake pedal, moveable between released and depressed states; and means for altering the axial position of the locking bolt in accordance with the state of the brake pedal.

2. The system of claim 1 further comprising:

a cover enclosing the locking bolt, having an aperture; and the locking bolt further including a pin extending axially from the inclined surface toward the aperture, the distance from the aperture to the pin and the size of the aperture permitting access to the interior of the cover from outside the cover by a tool able to displace the locking bolt axially.

3. The system of claim 1 further comprising a gearshift shaft assembly supported for rotation about its longitudinal axis, said assembly comprising:

a first shaft supported rotatably at an end distant from the gear selector lever;

an second shaft extending toward the first shaft from the gear selector lever, either the first shaft or the second shaft having a central longitudinal bore suited to receive the other shaft telescopically therein; and means for rotatably connecting mutually the first shaft and the second shaft and for permitting axial displacement of the first shaft relative to the second shaft.

4. The system of claim 1 wherein the altering means comprises:

an electrical power source;

electrical controller means connected by an electrical circuit to the power source and connected mechanically to the locking bolt, for displacing the locking bolt in accordance with the energized state and deenergized state of the electrical controller means.

5. The system of claim 2 further comprising a gearshift shaft assembly supported for rotation about its longitudinal axis, said assembly comprising:

a first shaft supported rotatably at an end distant from the gear selector lever, having a polygonal surface; and an second shaft extending toward the first shaft from the gear selector lever, having a polygonal surface, either the first shaft or the second shaft having a central longitudinal bore suited to receive the other shaft telescopically therein; and means for rotatably connecting mutually the first shaft and the second shaft and for permitting axial displacement of the first shaft relative to the second shaft.

6. The system of claim 3 wherein the longitudinal bore has a first polygonal surface and the outer surface of the other shaft is a second polygonal surface complementary to, and driveably engaging the first polygonal surface.

7. A system for controlling operation of a steering column mounted gear selector mechanism of an automatic transmission comprising:

a pivotably mounted gear selector lever having an arm extending radially from a pivot, the selector lever supported for rotation about an axis directed substantially parallel to the steering column;

a gear selector gate fixed in position, having recesses corresponding to selected gear range positions, the arm of the selector lever being located in and moveable between said recess as the selector lever pivots and rotates;

an actuating pin mounted for displacement along a first axis directed transverse to the steering column, having a blocking surface extending along a portion of the axis of the actuating pin and a recess extending along a second portion of said axis;

a first bolt mounted for displacement along a second axis directed substantially parallel to the steering column, having a first end adjacent the arm of the selector lever and a second end directed toward the actuating pin, contact between the blocking surface of the actuating pin and the second end preventing movement of the selector lever out of a recess in the selector gate, location of the second end in the recess of the actuator pin permitting movement of the selector lever out of a recess in the selector gate;

a locking bolt mounted for displacement along a third axis directed substantially parallel to the steering column, having a inclined surface extending along the length of the locking bolt such that the radial distance of the inclined surface from the third axis varies along the axis of the locking bolt, the actuating pin contacting the inclined surface;

a pivotably mounted brake pedal, moveable between released and depressed states; and means for altering the axial position of the locking bolt in accordance with the state of the brake pedal.

8. The system of claim 7 further comprising:

first spring means for resiliently biasing the second end of the first bolt toward the selector lever;

second spring means for resiliently biasing the actuating pin into contact with the inclined surface of the locking bolt.

9. The system of claim 7 further comprising:

a cover enclosing the locking bolt, having an aperture; and the locking bolt further including a pin extending axially from the inclined surface toward the aperture, the distance from the aperture to the pin and the size of the aperture permitting access to the interior of the cover from outside the cover by a tool able to displace the locking bolt along the third axis.

10. The system of claim 7 further comprising a gearshift shaft assembly extending substantially parallel to the steering column supported for rotation about its longitudinal axis, said assembly comprising:

a first shaft supported rotatably at an end distant from the gear selector lever;

an second shaft extending toward the first shaft from the gear selector lever, either the first shaft or the second shaft having a central longitudinal bore suited to receive the other shaft telescopically therein; and means for rotatably connecting mutually the first shaft and the second shaft and for permitting axial displacement of the first shaft relative to the second shaft.

11. The system of claim 7 wherein the altering means comprises:

an electrical power source;

electrical controller means connected by an electrical circuit to the power source and connected mechanically to the locking bolt, for displacing the locking bolt in accordance with the energized state and deenergized state of the electrical controller means.

12. The system of claim 8 further comprising a gearshift shaft assembly supported for rotation about its longitudinal axis, said assembly comprising:
a first shaft supported rotatably at an end distant form the gear selector lever, having a polygonal surface; and
an second shaft extending toward the first shaft from the gear selector lever, having a polygonal surface, either the second shaft or the lower shaft having a central longitudinal bore suited to receive the other shaft telescopically therein; and
means for rotatably connecting mutually the first shaft and the second shaft and for permitting axial displacement of the first shaft relative to the second shaft.

13. The system of claim 10 wherein the longitudinal bore has a first polygonal surface and the outer surface of the other shaft is a second polygonal surface complementary to, and driveably engaging the first polygonal surface.

* * * * *